United States Patent
Ledung et al.

(10) Patent No.: US 11,543,813 B2
(45) Date of Patent: Jan. 3, 2023

(54) METHOD AND CONTROL SYSTEM FOR CONTROLLING A REAL PRODUCTION PROCESS

(71) Applicant: ABB Schweiz AG, Baden (CH)

(72) Inventors: Lars Ledung, Västerås (SE); Rikard Hansson, Gothenburg (SE); Elise Thorud, Oslo (NO)

(73) Assignee: ABB Schweiz AG, Baden (CH)

( * ) Notice: Subject to any disclaimer, the term of this patent is extended or adjusted under 35 U.S.C. 154(b) by 269 days.

(21) Appl. No.: 16/954,549

(22) PCT Filed: Dec. 18, 2018

(86) PCT No.: PCT/EP2018/085611
§ 371 (c)(1),
(2) Date: Jun. 17, 2020

(87) PCT Pub. No.: WO2019/129549
PCT Pub. Date: Jul. 4, 2019

(65) Prior Publication Data
US 2020/0310398 A1    Oct. 1, 2020

(30) Foreign Application Priority Data
Dec. 28, 2017  (EP) .................................. 17210870

(51) Int. Cl.
G05B 19/418    (2006.01)

(52) U.S. Cl.
CPC ..... *G05B 19/41885* (2013.01); *G05B 19/418* (2013.01); *G05B 19/4183* (2013.01);
(Continued)

(58) Field of Classification Search
CPC ............ G05B 19/41885; G05B 19/418; G05B 19/4183; G05B 2219/32342;
(Continued)

(56) References Cited

U.S. PATENT DOCUMENTS 6,816,822 B1 * 11/2004 Hess .................... G05B 13/042
 700/32
10,036,328 B2 * 7/2018 Brummel ............. G05B 13/027
(Continued)

FOREIGN PATENT DOCUMENTS

EP    1520215 B1    9/2007
EP    2296063 A2    3/2011
(Continued)

OTHER PUBLICATIONS

European Search Report Application No. EP 17 21 0870 Completed: May 15, 2018; dated May 25, 2018 7 pages.
(Continued)

*Primary Examiner* — Christopher E. Everett
(74) *Attorney, Agent, or Firm* — Whitmyer IP Group LLC

(57) ABSTRACT

A method of controlling a real production process, wherein the method includes: a) receiving initial condition data from an on-line simulator system simulating the real production process, and b) performing an optimization based on the
(Continued)

initial condition data and on an objective function to obtain set points for controlling the real production process.

6 Claims, 1 Drawing Sheet

(52) U.S. Cl.
CPC ............. *G05B 2219/32342* (2013.01); *G05B 2219/32344* (2013.01)

(58) Field of Classification Search
CPC ........... G05B 2219/32344; G05B 2219/24215; G05B 2219/32404; G05B 2219/32406; G05B 2219/35308; G05B 17/02; Y02P 90/02
See application file for complete search history.

(56) References Cited

U.S. PATENT DOCUMENTS

| | | | |
|---|---|---|---|
| 10,061,279 B2* | 8/2018 | Eck | ........................ G06N 7/00 |
| 2007/0168057 A1* | 7/2007 | Blevins | ............... G05B 13/022 |
| | | | 700/53 |
| 2008/0027704 A1* | 1/2008 | Kephart | ........... G05B 19/41885 |
| | | | 703/22 |
| 2013/0317629 A1 | 11/2013 | Shapiro et al. | |

FOREIGN PATENT DOCUMENTS

| | | |
|---|---|---|
| EP | 2296063 A3 | 11/2011 |
| JP | 2009169772 A | 7/2009 |
| WO | 2007067645 A2 | 6/2007 |
| WO | 2007067645 A3 | 9/2007 |

OTHER PUBLICATIONS

International Preliminary Report on Patentability Application No. PCT/EP2018/085611 Completed: Mar. 17, 2020; dated Mar. 17, 2020 17 pages.

Krist V. Gernaey; et al. "Process Systems Engineering, 5. Process Dynamics, Control, Monitoring, and Identification" In: "Ullmann's Encyclopedia of Industrial Chemistry", Oct. 15, 2012, Wiley-VCH Verlag, Weinheim; XP055104356 pp. 47-55.

Japanese Office Action; Application No. 2020-533094; Completed: Aug. 27, 2021; dated Sep. 7, 2021; 6 Pages.

EPO Summons to attend oral proceedings pursuant to Rule 115(1) EPC; Application No. 17 210 870.6; dated Feb. 3, 2022; 9 Pages.

European Office Action; Application No. 17 210 870.6; dated Jan. 21, 2021; 7 Pages.

* cited by examiner

METHOD AND CONTROL SYSTEM FOR CONTROLLING A REAL PRODUCTION PROCESS

TECHNICAL FIELD

The present disclosure generally relates to process control.

BACKGROUND

Complex production processes such as pulp and paper production and chemical production processes, involving a great plurality of control variables, are normally controlled using advanced control strategies. One example of a control strategy in complex production processes is disclosed in EP 1 520 215 B1. This document discloses a process modeled by a dynamic model, handling time dependent relations between manipulated variables of different process sections and measured process output variables. Suggested input trajectories for manipulated variables for a subsequent time period are obtained by optimizing an objective function over a prediction time period, under constraints imposed by the dynamic process model and/or preferably a production plan for the same period. The objective function comprises relations involving predictions of controlled process output variables as a function of time using the process model, based on the present measurements, preferably by a state estimation procedure.

A drawback with the method disclosed in EP 1 520215 B1 is that the initial state estimation is time-consuming and may take several minutes, even using modern computational aids. The initial states thus obtained may therefore not reflect the current state of the process once optimization commences.

WO 2007/067645 A2 discloses a multi-objective protective process optimization with a concurrent process simulation, which involves simulating the process and producing a simulated output of the process, developing a set of target values based on measured inputs from the process and based on the simulated output from the process simulator, and producing multiple control outputs configured to control the process based on the set of target values.

US 2013/317629 A1 discloses a method which involves real-time dynamic process simulation. The system mathematically determines static and dynamic characteristics of the real process by creating a concurrent virtual process. At any given point of time, historical information is used for real time simulation to dynamically forecast the process behavior based on the mathematical models. Then optimization is used to simulate control actions that correspond to optimization criteria. An optimal mode is found and either supplied to an operator or control actions are executed in real time by MVPC.

SUMMARY

In view of the above, an object of the present disclosure is to provide a method of controlling a real production process which solves, or at least mitigates, the problems of the prior art.

There is hence according to a first aspect of the present disclosure provided a method of controlling a real production process, wherein the method comprises: a) receiving initial condition data from an on-line simulator system simulating the real production process, and b) performing an optimization based on the initial condition data and an objective function to obtain set points for controlling the real production process.

The method hence uses initial condition data obtained from an on-line simulation of the real production process in a real-world production process.

By using the on-line simulator, which may run in real-time in parallel with the real production process, initial conditions may be obtained whenever required, because the simulated current values of the state variables are immediately available at any given time.

The initial condition is the states of process variables in the process model of an on-line simulator and of the controllers used in the process model.

The initial condition data may for example comprise the state of the real production process as determined by the on-line simulator system based on simulated state variable values.

The method may advantageously be used in the process industry, for example in pulp and paper production as well as in the oil and gas industry or in a chemical production process. Hereto, the real production process may for example be a pulp and paper production process, an oil and gas related process in the oil and gas industry, or a chemical production process.

One embodiment comprises c) providing the set points to controllers to control the real production process. The set points may be provided on a time-scale for the controllers of the control system. To this end, the set points may be provided as an output to the controllers in the form of a schedule or set point trajectories. This allows for the controllers to use set points according to the schedule for the given time window. This schedule may be updated in a subsequent or later iteration of the method.

One embodiment comprises testing the set points obtained in step b) before step c) and performing step c) only if the set points are validated in the test. Hereto, the set points obtained from the optimization may be tested before being used in the real production process. The control of the real production process may thereby be improved. In particular, the dynamic model of the real production process and/or of the dynamic model used in the optimization may be tuned based on the test, to thereby improve the dynamic model(s).

The test may be initiated automatically and performed after the set points have been determined. Alternatively, the test may be initiated manually by an operator after the set points have been determined.

According to one embodiment, the testing involves using the set points in an auxiliary process simulation to obtain test-simulated process state variables, wherein the set points are validated if the test-simulated process state variables are within an acceptable range. The acceptable range may be a predetermined range for example determined by one or more constraints, such as alarm limits.

According to one embodiment, the testing comprises running the auxiliary process simulation faster than real-time to obtain the test-simulated process state variables. An actual test of the set points and the reaction thereto of the simulated production process may be provided before they are to be used in the control.

One embodiment comprises providing the set points as input to the on-line simulator system if the set points are validated in the test. The set points may hence in addition to being provided to the controllers in the real production process, also be provided to the on-line simulator system such that the on-line simulator system receives the same input as the real production process.

According to one embodiment, the on-line simulator system runs in real-time, parallel to the real production process based on real-time process data and events. Alternatively, or additionally, the on-line simulator system may run on near-real time data and events from a historian. The historian may be a local or remote server.

There is according to a second aspect of the present disclosure provided a computer program comprising computer code which when executed by processing circuitry of a control system causes the control system to perform the method according to the first aspect.

There is according to a third aspect of the present disclosure provided a control system for controlling a real production process, comprising: a storage medium comprising computer code, and processing circuitry, wherein when the computer code is executed by the processing circuitry, the control system is configured to receive initial condition data from an on-line simulator system configured to simulate the real production process, and perform an optimization based on the initial condition data and on an objective function to obtain set points for controlling the real production process.

According to one embodiment the control system is configured to provide the set points to controllers to control the real production process using the set points.

According to one embodiment the control system is configured to test the set points and to provide the set points to the controllers only if the set points are validated in the test. The set points can in case they have been validated be provided both to the soft controllers of the on-line simulator system and to the controllers of the real production process.

According to one embodiment the control system is configured to perform an auxiliary process simulation which simulates the real production process off-line using the set points to obtain test-simulated process state variables, wherein the set points are validated if the test-simulated process state variables are within an acceptable range.

According to one embodiment the control system is configured to run the auxiliary process simulation faster than real-time to obtain the test simulated process state variables. This tool could for example be used as a complement to the on-line optimization, i.e. the optimization performed based on the initial condition data and the objective function, or as a test.

According to one embodiment the control system is configured to provide the set points as input to the on-line simulator system if the set points are validated in the test. In this case, the set points may also be provided to the controllers of the real production process.

Generally, all terms used in the claims are to be interpreted according to their ordinary meaning in the technical field, unless explicitly defined otherwise herein. All references to "a/an/the element, apparatus, component, means, etc." are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
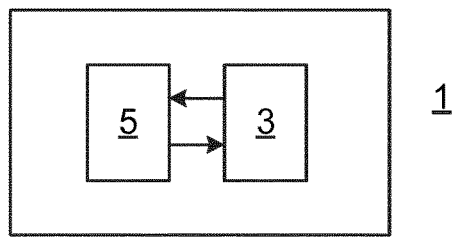
FIG. 1 schematically depicts a control system.

FIG. 1 shows an example of a control system 1 for controlling a real, i.e. a real-world, production process. The control system 1 comprises processing circuitry 3 and a storage medium 5.

The processing circuitry 3 may use any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed operations concerning control of a real production process.

The storage medium 5 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

Figure 2:
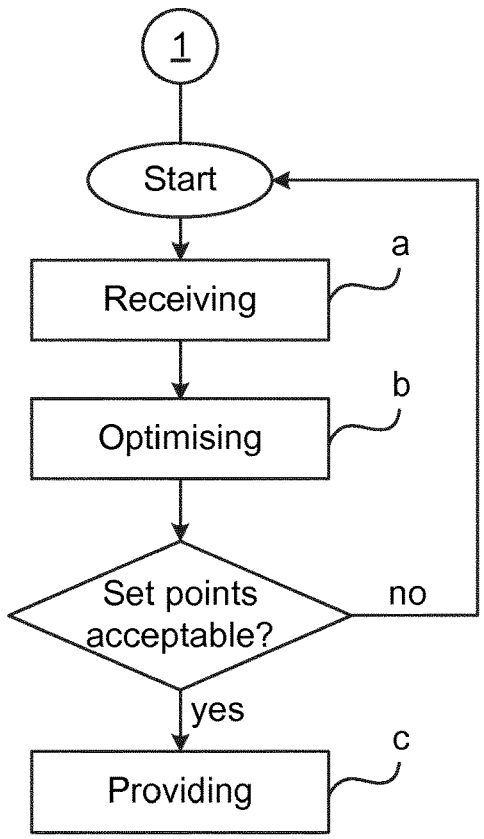
FIG. 2 shows a flow chart of an example of controlling a real production process.

The operation of the control system 1 will now be described with reference to FIGS. 2 and 3. FIG. 2 is a flow chart of a method of controlling a real production process using the control system 1.

Figure 3:
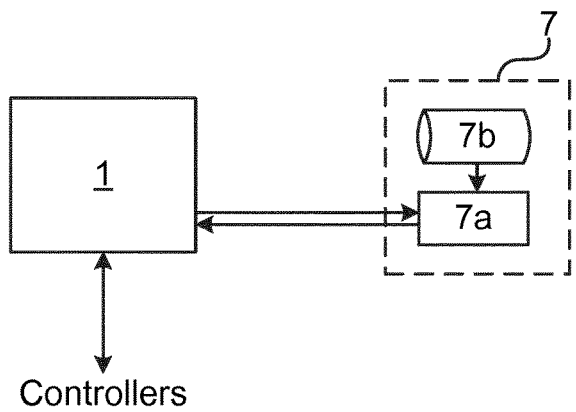
FIG. 3 schematically depicts the control system in communication with controllers and an on-line simulation system.

As shown in FIG. 3, the control system 1 may also comprise a plurality of controllers. The processing circuitry 3 may be configured to communicate directly or indirectly with the controllers. The controllers may be installed in the plant environment to control various process parameters or manipulated variables. The controllers may for example form part of a distributed control system (DCS).

As illustrated in FIG. 2 in a step a) the control system 1 receives initial condition data. The initial condition data is obtained from an on-line simulator system 7. The on-line simulator system 7 may or may not form part of the control system 1.

The initial condition data may preferably comprise a state of the real production process as determined by the on-line simulator system 7.

In a step b) an optimization is performed based on the initial condition data received from the on-line simulator system 7 in step a).

The optimization involves using an objective function and constraints to obtain optimal solutions or manipulated variable trajectories. The constraints may include a dynamic model of the real production process. These optimal solutions or trajectories for the manipulated variables are the set points for the controllers. In particular, the set points are set point trajectories, since they provide set points over time for each manipulated variable. The set point trajectories may be seen as a set point schedule to the controllers. The trajectories hence define the future state variables of the real production process. The control system 1 may be configured to present the trajectories visually on a display to an operator.

The objective function may be created on-line based on optimizing criteria. The optimizing criteria may for example be input to the control system 1 by an operator. The objective function may comprise one or a set of objective functions. The objective function(s) may be predefined for different use cases such as maximal profit, minimal environmental impact and so on.

The control system 1 is configured to provide the set points to the controllers. Thus, in a step c) the set points are provided to the controllers. In particular, the set point trajectories as such may be provided to the controllers, which, as noted above, thereby obtain a schedule for the control of the real production process.

Before providing the set points to the controllers, the set points may be validated. In one example, the control system 1 is configured to validate the set points. The validation may be based on auxiliary constraints not included in the optimization as such. The auxiliary constraints may for example relate to upcoming changes in the real production process, known to the operator but not yet provided as constraints or in any other way for the purpose of optimization. This test may be initiated automatically or manually by an operator. In case the test fails, new initial condition data may be received by the control system 1, and an optimization based on the new initial condition data may be performed. The set points may according to this example only be sent to the controllers in case the set points are accepted in the test.

The control system 1 may in one variation be configured to test the set points obtained from the optimization by means of an offline simulation. The set points may thereby be validated in the sense that their impact on the real production process may be evaluated before being used in the real production process.

The control system 1 is configured to validate the set points determined by means of the optimization using an auxiliary process simulation. In particular, the control system 1 is configured to perform the test or validation by using the set points in the auxiliary process simulation to obtain test-simulated process state variables. The set points may for example be validated if the test-simulated process state variables are within an acceptable range. For example, the test-simulated process state variables may be validated if the test-simulated process state variables are within a predetermined range from predicted values of the process state variables, as estimated in the optimization or if they satisfy certain constraints.

The testing may comprise running the auxiliary process simulation faster than real-time to obtain the test-simulated process state variables. In this manner, the set points may be tested before they are to be used. The testing may for example be performed before step c), i.e. before the set points are provided to the controllers, or alternatively after step c). In case the set points are validated, they may be used with essentially known outcome in the control of the real production process. The result of the test may also be used to tune the dynamic model in the optimization and/or in the on-line simulator system 7, as illustrated by the dotted arrow lines A which shows a feedback of the simulation result.

The on-line simulator system 7 may comprise an on-line simulator 7a configured to perform the simulation of the real production process. The on-line simulator 7a uses a dynamic model of the real production process. The dynamic model may also comprise additional modeled features such as controllers and field devices.

The on-line simulator 7a may obtain the status or state of all the real controllers deployed in the real production process and process data in real-time or essentially in real-time. This status may for example include the current set points of the controllers and/or settings input to the controllers by the operator.

The on-line simulator 7a is configured to run in real-time, in parallel with the real production process. The on-line simulator 7a may be configured to run based on real-time process data and events or near real-time data concerning the real production process obtained from a local or remote historian 7b and used in the simulation by the on-line simulator 7a.

The control system 1 may be configured to also provide the set points to the on-line simulator 7a. In this manner, the on-line simulator 7a will be fed with the same control data as the real production process.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method of controlling a real production process, wherein the method comprises:
   a) receiving initial condition data from an on-line simulator system simulating the real production process, the initial condition data including the state of the real production process as determined by the on-line simulator system based on simulated state variable values,
   b) performing an optimization based on the initial condition data received from the on-line simulator system, wherein the optimization involves using an objective function and constraints to obtain optimal solutions or manipulated variable trajectories which are set points for controllers for controlling the real production process, and testing the set points obtained in step b),
   c) providing the set points to the controllers to control the real production process only if the set points are validated in the test, and
   tuning a dynamic model of the real production process and/or a dynamic model used in the optimization based on the test,
   wherein the testing involves using the set points in an auxiliary process simulation to obtain test-simulated process state variables, wherein the set points are validated if the test-simulated process state variables are within an acceptable range,
   wherein the testing comprises running the auxillary process simulation faster than real-time to obtain the test-simulated process state variables, and
   wherein the on-line simulator system runs in real-time, parallel to the real production process based on real-time process data and events.

2. The method as claimed in claim 1, comprising providing the set points as input to the on-line simulator system if the set points are validated in the test.

3. A computer program comprising computer code which when executed by processing circuitry of a control system causes the control system to perform the method including:
   a) receiving initial condition data from an on-line simulator system simulating a real production process, the initial condition data including the state of the real production process as determined by the on-line simulator system based on simulated state variable values, b) performing an optimization based on the initial condition data received from the on-line simulator system, wherein the optimization involves using an objective function and constraints to obtain optimal solutions or manipulated variable trajectories which are set points for controllers for controlling the real production process, and testing the set points obtained in step b), c) providing the set points to the controllers to control the real production process only if the set points are validated in the test, and tuning a dynamic model of the real production process and/or a dynamic model used in the optimization based on the test, wherein the testing involves using the set points in an auxiliary process simulation to obtain test-simulated process state variables, wherein the set points are validated if the test-simulated process state variables are within an acceptable range, wherein the testing comprises running the auxiliary process simulation faster than real-time to obtain the test simulated process state variables, and wherein the on-line simulator system runs in real-time, parallel to the real production process based on real-time process data and events.

4. A control system for controlling a real production process, comprising:
a storage medium including computer code, and
processing circuitry,
wherein when the computer code is executed by the processing circuitry, the control system is configured to:
receive initial condition data from an on-line simulator system configured to simulate the real production process, the initial condition data including the state of the real production process as determined by the on-line simulator system based on simulated state variable values, and perform an optimization based on the initial condition data received from the on-line simulator system, wherein the optimization involves using an objective function and constraints to obtain optimal solutions or manipulated variable trajectories which are set points for controllers for controlling the real production process, and test the set points obtained, wherein the processing circuitry is configured to provide the set points to controllers to control the real production process using the set points only if the set points are validated in the test, wherein the control system is configured to tune a dynamic model of the real production process and/or a dynamic model used in the optimization based on the test, wherein the test involves using the set points in an auxiliary process simulation to obtain test-simulated process state variables, wherein the set points are validated if the test-simulated process state variables are within an acceptable range, wherein the test comprises running the auxiliary process simulation faster than real-time to obtain the test-simulated process state variables, and wherein the on-line simulator system runs in real-time, parallel to the real production process based on real-time process data and events.

5. The control system as claimed in claim 4, wherein the control system is configured to perform the auxiliary process simulation which simulates the real production process off-line using the set points.

6. The control system as claimed in claim 4, wherein the control system is configured to provide the set points as input to the on-line simulator system if the set points are validated in the test.

* * * * *